(12) United States Patent
Roylance et al.

(10) Patent No.: US 6,390,579 B1
(45) Date of Patent: May 21, 2002

(54) PULSE WIDTH MODULATOR USING DELAY-LINE TECHNOLOGY WITH AUTOMATIC CALIBRATION OF DELAYS TO DESIRED OPERATING FREQUENCY

(75) Inventors: Eugene A. Roylance, Boise; Wayne E. Bradburn, Eagle, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/293,520

(22) Filed: Apr. 15, 1999

(51) Int. Cl.[7] .............................. B41J 29/38; H03K 7/08
(52) U.S. Cl. ............................ 347/9; 332/109; 332/110
(58) Field of Search ........................... 347/9, 139, 140; 332/106–111

(56) References Cited

U.S. PATENT DOCUMENTS

| | | | |
|---|---|---|---|
| 5,363,406 A | * 11/1994 | Han | 375/22 |
| 5,424,321 A | * 6/1995 | Yoshida et al. | 332/109 |
| 6,091,891 A | * 7/2000 | Overall et al. | 358/1.13 |

FOREIGN PATENT DOCUMENTS

EP    0884892 A2    12/1998    ............ H04N/1/40

* cited by examiner

Primary Examiner—John Barlow
Assistant Examiner—Alfred E Dudding (57) ABSTRACT

A pulse width modulator includes a clock operative to count successive discrete time intervals having a period equal to a desired full pulse width, and configured to generate a clock signal. The pulse width modulator also includes an adjustable delay line comprising a plurality of delay line elements, each delay line element operative to generate a clock signal at a specific location, which when combined with a transitional instruction, will produce a modulated output that has a plurality of transitions within the clock period. The pulse width modulator further includes processing circuitry configured to receive the clock signal and a pulse code input and operative to select one of the delay line elements to generate a clock signal at a specific location to produce a single modulated output that transitions at a desired modulated frequency. A method is also provided.

19 Claims, 8 Drawing Sheets

PULSE WIDTH MODULATOR USING DELAY-LINE TECHNOLOGY WITH AUTOMATIC CALIBRATION OF DELAYS TO DESIRED OPERATING FREQUENCY

FIELD OF THE INVENTION

This invention relates in general to pulse width modulation (PWM) techniques, and more particularly, to an automatically calibrated pulse width modulator.

BACKGROUND OF THE INVENTION

In the past, pulse width modulation (PWM) techniques have been used in the context of control signal generation and also for electronic converters/inverters. Such converters/inverters employ square-wave switching wave forms wherein pulse width is varied in order to control load voltage. Such techniques have also been employed in the construction of integrated circuits (ICS) having pulse width modulators (PWMs).

One prior art technique for implementing an integrated circuit (IC) pulse width modulator (PWM) utilizes a design solution wherein the pulse width modulator (PWM) is run with a much higher clock frequency to generate the desired signal pulse widths and pulse justifications. The required clock frequency for a pulse width modulator (PWM) is proportional to the resolution, or granularity, of the pulse widths that can be generated. For example, where pulse widths ranging from 0 to 64 can be specified, in increments of ¹⁄₆₄th of the output period, such prior art solution technique would require a clock frequency that is 64 times the primary clock frequency. However, the resulting clock frequencies could be near 1 GHz, which is very difficult to implement in an integrated circuit (IC).

Another prior art technique for implementing an integrated circuit (IC) pulse width modulator (PWM) utilizes an analog voltage ramp circuit to calculate periods of time. The resulting circuit requires calibration of the ramp circuit to a desired frequency. A desired pulse width number, or value, is converted to a voltage value for the ramp reference voltage. The voltage value is proportional to the pulse width. A pulse is initiated when the voltage ramp begins, and ends when the ramp voltage reaches the reference voltage. Here, the reference voltage is generated from the pulse width input using a digital-to-analog converter (DAC). Such prior art design requires only the primary clock frequency to drive the control logic. However, such a design requires sensitive analog circuitry, which is not possible to implement in a digital-only integrated circuit (IC). Digital-only integrated circuits (ICS) tend to be the least expensive type of integrated circuit (IC) available. Hence, mixed analog and digital integrated circuits (ICS) are generally more expensive and more difficult to design.

Therefore, there exists a need for an improved pulse width modulator (PWM) that can be implemented on an integrated circuit (IC) in a manner that is more manageable, cost-effective and accurate than the prior art techniques.

Furthermore, there exists a need for a pulse width modulator (PWM) that can be implemented in an all-digital integrated circuit (IC). Such need exists for a design that is relatively small and east to implement, and that can be calibrated at any time without having to go into a special operating mode.

SUMMARY OF THE INVENTION

A reasonably accurate pulse width modulator is provided that is capable of being implemented in an all-digital integrated circuit (IC). Such modulator requires only a primary clock frequency, wherein the clock frequency is equal to the inverse of the pulse width modulator (PWM) output period. Such design proves relatively small and easy to implement. Additionally, the design includes a mechanism for doing self-calibration, which reduces the amount of system interaction and overhead. With this new modulator design, calibration needs to be performed since the modulator design relies on a delay-line technology in order to generate multiple, delayed clocks. These delay elements will not have a constant delay, but will vary with the specifics of the integrated circuit process, the operating temperature, and operating voltage changes. The self-calibration feature will allow delay settings to change, such that the delayed clocks will be proportional to the desired operating frequency. Additionally, this self-calibration process can be repeated often in order to compensate for sudden operating-condition changes.

According to one aspect of the invention, a pulse width modulator includes a clock operative to count successive discrete time intervals having a period equal to a desired full pulse width, and configured to generate a clock signal. The pulse width modulator also includes an adjustable delay line comprising a plurality of delay line elements, each delay line element operative to generate a clock signal at a specific location, which when combined with a transitional instruction, will produce a modulated output that has a plurality of transitions within the clock period. The pulse width modulator further includes processing circuitry configured to receive the clock signal and a pulse code input and operative to select one of the delay line elements to generate a clock signal at a specific location to produce a single modulated output that transitions at a desired modulated frequency.

According to another aspect of the invention, a printer is provided which includes a print engine having a pulse width modulator including a clock operative to count successive discrete time intervals having a period equal to a desired full pulse width, and configured to generate a clock signal, an adjustable delay line comprising a plurality of delay line elements, each delay line element operative to generate a clock signal at a specific location so as to generate a plurality of clocks, the plurality of clocks in cooperation with a transitional instruction, operative to produce a modulated output that has a plurality of transitions within the clock period, processing circuitry configured to receive the clock signal and a pulse code input and operative to select one of the delay line elements to generate a clock signal at a specific location so as to produce a single modulated output that transitions at a desired modulated frequency. The printer also includes an image-forming device configured to receive the single modulated output from the pulse width modulator and usable to generate a print image.

According to yet another aspect of the invention, a method of generating a pulse width modulated output is provided which includes an adjustable delay line operative to generate a plurality of adjustable delay line clocks to produce a modulated output that has a plurality of transitions within a clock period, delivers a system clock signal to the processing circuitry, and generates a transitional instruction that toggles the modulated output that is generated at a primary clock frequency.

One advantage of this invention is the resulting relatively smaller sized pulse width modulator (PWM) that can be produced on an all-digital integrated circuit (IC).

Another advantage of this invention is provided by the ability to calibrate delay cells to a desired frequency or anywhere within a broad range of frequencies, particularly the ability to calibrate multiple times during the printing of image data.

Yet another advantage of this invention is provided by the ability to frequently calibrate such delay cells to a desired frequency.

Yet even further advantages of this invention are provided wherein a self-calibration mechanism lends to more complete testing and verification of the integrated circuit (IC), thereby reducing unexpected failures. Additionally, the delay-line implementation of Applicant's invention tends to provide a more accurate pulse width modulator (PWM) than was provided by previous delay-line technologies.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

As used in the context of Applicant's invention, a pulse width modulator (PWM) is understood to be a device that generates a pulse in the form of an electrical signal. The pulse has a pulse width that is controlled by passing the pulse width modulator (PWM) device a number that correlates to the desired pulse width. The pulse width comprises the time that the signal is in an active state. The pulse can be justified within a period of time, in which it is generated, to some pre-defined position(s). For example, the pulse can be justified to the left, right, or center position of an output period. However, it is understood that other justifications could also be defined. Pursuant to Applicant's invention, a pulse width modulator (PWM) is provided with a new pulse code, that defines both width and justification, once every output period. Here, output period refers to clock period, which is the inverse of the frequency of the clock that is driving the pulse width modulator (PWM).

The reason for using a delay-line technology implementation of a pulse width modulator (PWM) is to generate several independent clocks. Here, clock refers to an electronic circuit that regulates synchronization of the flow of information through the internal communication channels of a computer system and operative to generate clock signals. Each clock's rising edge occurs at a time that linearly progresses across the period. It is necessary that the clocks are configured to occur at possible transition points of the output signal. Hence, if a pulse width has a resolution of 32, then at least 32 clocks are needed. A resolution of 32 means pulse widths of $\frac{1}{32}$nd of a period increments can be specified. For one ideal case, there should be 32 clocks with increasing delays such that the clocks are spread equally across the output period. Therefore, the clock associated with a transition of the output signal can be fed data that will initiate the output signal change. A block diagram of such construction will be described below in greater detail with reference to FIG. 1.

Figure 1:
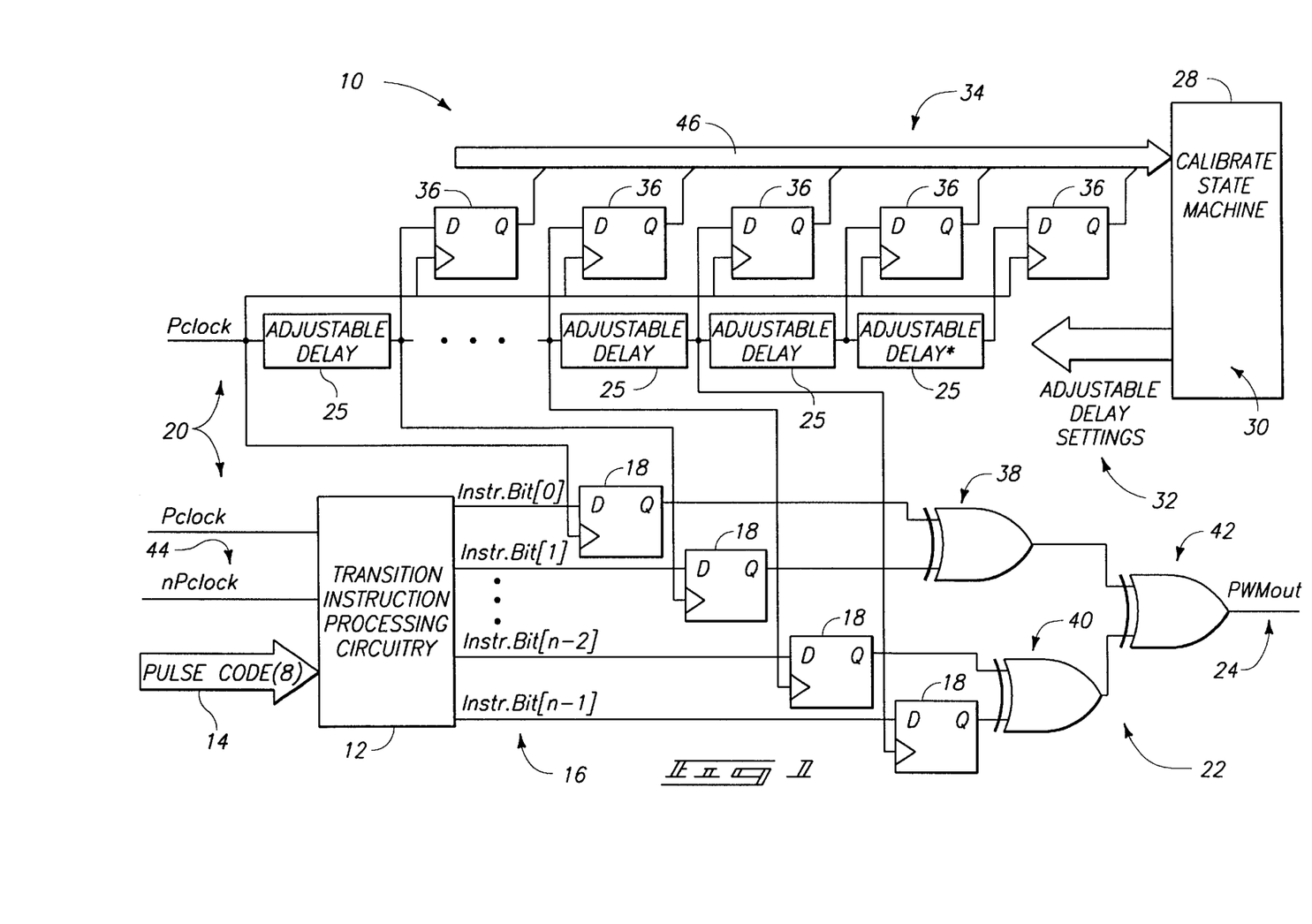
FIG. 1 is a block diagram of the pulse width modulator (PWM) according to the present invention.

As shown in FIG. 1, pulse width modulator 10 includes vector generation circuitry in the form of transition instruction processing circuitry 12, depicted as a functional block, operative to receive a pulse code input 14 and generate a vector output 16 that indicates where signal transitions should occur. According to one implementation, pulse code input comprises a data input which has two bits defining the justification and six bits defining pulse width. Vector output 16 comprises one of several possible vector outputs ranging from vector [0] to vector [n−1].

As an example, vector [0] transition indicates a transition at the left-most point of the output period. As a second example, the vector [5] bit of a 32-bit resolution system would control transition of a $\frac{5}{32}$nd period location, as measured from a left-most side.

Hence, each of vector outputs 16, ranging from vector [0] to vector [n−1], comprises a vector bit that is loaded into a flip-flop storage element, such as registers, 18 when the associated clock 20 goes high. In operation, each vector bit of vector output 16 will change state when a transition is to occur. An "exclusive-or" circuitry implementation 22, or tree, is provided downstream of flip-flop storage elements 18 and is operative to continuously add up all of the resulting flip-flop values. If a flip-flop value changes from an even to an odd number, or vice versa, the resulting output will change. Therefore, when a flip-flop 18 changes value at its designated time, via clock 20, the resulting output 24 will change state. The actual polarity of output 24 is kept track of in transition instruction processing circuitry 12. Whether there are an odd or even number of bits in flip-flops 18 will determine the actual polarity of output 24. In operation, elements 18 combine with circuitry 22 to provide logic circuitry.

Also shown in FIG. 1, clock signals generated by clock 20 are delayed by a series of delay cells 25. Each of cells 25 has a unique characteristic of being able to increase the amount of delay via use of selection inputs. By adjusting the delay of each delay cell 25 to a fine degree, the clock pulses that are delivered to associated circuitry can be adjusted to a desired position within an output.

A calibrate state machine 28 comprising calibration control logic 30 implemented via associated circuitry is used to calculate the delay selection inputs to each adjustable delay 25. Such delay selection inputs comprise adjustable delay settings 32. Calibration control logic 30 measures the position of the clocks, and determines a new selection profile that may place the clocks closer to their ideal location. The steps of measurement and adjustment continue until the clocks are as close to their ideal location as possible. When pulse width modulator (PWM) 10 is actively producing pulses, the calibration process is suspended in order to avoid uncertainty being generated on output 24.

The implementation of pulse width modulator (PWM) 10 provides an economical solution pursuant to Applicant's invention. As shown in FIG. 1, pulse width modulator 10 is implemented in a digital-only integrated circuit 34. Pursuant to implementations discussed below in greater detail, pulse width modulator 10 can be described with a Hardware Description Language (HDL) that is capable of being compiled, which provides for a faster implementation. Furthermore, Applicant's invention does not require a large storage media in order to match actual delays to desired positions.

A further benefit of Applicant's invention results in that the design for pulse width modulator 10 requires only a primary clock frequency (Pclock) as an input, namely, clock 20. Hence, high-frequency clocks do not need to be generated when using Applicant's invention. Furthermore, there are no analog components utilized in constructing pulse width modulator 10. Analog components tend to limit the selection of integrated circuits in which the device can be implemented. Furthermore, the frequency range in which Applicant's device can operate, as well as the accuracy of the pulse waveform outputs 24, are limited only by the speed and stability of the integrated circuit 34. Hence, as faster integrated circuit constructions and devices become available, faster implementations for pulse width modulator 10 can also be implemented. Accordingly, the constraints normally associated with analog circuit implementations provided in conjunction with digital circuitry do not impose constraints on Applicant's invention. Another advantage is provided in that you can have as many transitions on the output (PWMout) 24 as there are delay taps provided in the circuit design.

Some possible design solutions require translation when mapping desired pulse widths to specific delay values, which can be time consuming or require additional circuitry, such as a look-up table stored in memory. Hence, there was determined to be a need to design a pulse width modulator that would address the many identified design problems by having an auto-calibration mechanism designed therein. Such auto-calibration mechanism would allow the pulse width modulator to be re-calibrated in between lines during, for example, a printing operation, instead of in between pages, in order to keep accuracy up. Since no firmware interaction is required to calibrate the pulse width modulator, the firmware is free to do other things. Hence, Applicant's new design does not require translation via a look-up table, as would be required by other design efforts, which reduces the cost and allows for more transitions per clock without adding significant cost. Neither does Applicant's technique require a calibration by the system processor, because there is no special calibration being made. Instead, Applicant's technique utilizes an automatic calibration device. Additionally, the functional tester can measure delays of a calibrated pulse width modulator, thus testing both tap delays and the calibration mechanism.

One basic difference with Applicant's invention shown in FIG. 1, as compared to the related art pulse width modulator design, results in that the taps are designed to have a delay element that is programmable. Accordingly, Applicant's design has a calibration mechanism that controls the delay of the entire tap line, adjusting the programmable delays according to the calibration measurement, then iterating this process until the desired tap line delay is found. Pursuant to Applicant's design, the number of delay taps required corresponds with the number of segments that are desired. When calibrated, each delay tap should be close to the ideal segment location, assuming the delay elements have equal delay properties and loading. Therefore, any number of transitions could be generated, since no mapping of ideal position to actual tap position is needed.

Returning to the block diagram illustration of Applicant's pulse width modulator 10, shown in FIG. 1, the auto-calibration features of pulse width modulator 10 are shown according to one implementation. More particularly, input 14 comprises a pulse code which forms an eight-bit data input wherein two bits define justification and six bits define pulse width. Therefore, a maximum definable resolution of $\frac{1}{64}$th of a clock period is provided. In other words, the maximum number (n) of taps, or vector bits, that can be used is 64. Preferably, the actual number of taps should prove to be 64 divided by a power of two, for purposes of product standardization. Such construction is possible if two pulse width modulators are used with different resolution, and the same pulse code. By default, the number of taps is assumed to be 32. Additionally, the actual pulse width is always one greater than the pulse code width, except for the case where the actual pulse width is zero, which means there is no pulse present.

Vector generation circuitry in the form of transition instruction processing circuitry 12, depicted as a block in FIG. 1, takes pulse code input 14 and selects which bits within the vector need to be toggled in order to generate the defined pulse. For example, a left-justified pulse width of 17 units will result in toggling vector [0] in order to start the pulse at the beginning of a clock period, and will toggle vector [18] in order to end the pulse after 18 units have passed. These values are presented to the flip-flop registers 18 outside the block of vector generation circuitry 12. Each vector bit is then loaded into its respective flip-flop 18 when its delayed clock goes high. The adjustable delay blocks 26 delay the clock one unit per tap. For example, $\frac{1}{32}$nd of a clock pulse is provided as a delay, when there are 32 taps implemented. The vector [0] bit will cause a transition to propagate out through the "exclusive-or" tree 22 and a PWMout signal 24 goes high when the Video Clk signal 20 first rises; for example, after no clock delay. After 18 units of time, the vector [18] clock loads the associated flip-flop register 18 and causes another transition to propagate out, and causes the PWMout signal 24 to toggle. Thus, PWMout signal 24 will be low again.

Adjustable delay blocks 25 are set to delay values such that after the specified number of taps, the total delay is roughly equal to the clock period. Therefore, each block has a delay roughly equal to the clock period divided by the number of taps. Calibrate state machine 28 controls the adjustment of delay blocks 25 in order to meet this criterion. Calibrate state machine 28 measures the delays by sampling the delayed clock taps via common line 46. Calibrate state machine 28 will increase, or decrease, the delay to one or more of delay blocks 25, according to the resulting measurement, and then will check the resulting delay again. State machine 28 continues to iterate in this manner, until the calibration criterion is met. FIG. 1 shows the output from state machine 28 as "adjustable delay settings" 32 which will ultimately connect to each adjustable delay block 25. For purposes of simplification, such connections are not shown in this figure in an attempt to keep the diagram from getting too complicated and unwieldy. However, it is understood that such connections occur between state machine 28 and individual adjustable delay blocks 25.

Transition instruction processing circuitry 12 comprises a vector generation block as shown in FIG. 1. A main input to block 12 comprises an eight-bit, or byte, pulse code 14. The two most significant bits of this byte define justification. If these two bits equal 0, the pulse will be centered within the clock period. If these two bits equal 1, the pulse width will be divided into two, one part justified against the left side of the clock period and the other part justified to the right side of the clock period. If the two bits are equal to 2, the pulse is justified to the left side of the clock period. Otherwise, for a value equal to 3, the pulse will be justified to the right side of the clock period. The remaining six bits, or lower bits, of the byte comprising pulse code 14 define the pulse width. Only the bits that are needed to address the number of taps are used in this block. For example, only bits 5 down to 1 are used if 32 taps are specified. Of course, a pulse width of zero, for the bits of interest, like 5 down to 1, results in no pulse output. Any other pulse width will generate a transition vector as illustrated below.

For purposes of this disclosure, toggle-command bits are internal signals within the transition instruction processing circuitry which control the inversion, or toggle, of individual instruction bits. The toggle-command bits thereby toggle the individual instruction bits. Accordingly, toggle-command bits comprise an array of bits. An array of toggle bits can also be referred to as a transition vector.

In order to generate a transition vector, for a non-zero pulse width, the actual width is one greater than the value being input. For example, the pulse width, for an input greater than zero with 32 taps, is Pulse_Code [5:1]+1. This width is used to select toggle-command bits, that are associated with the delay taps, that will cause transitions on the output 24. By default, transition-vector bits are set to zero, meaning no transition or toggle. Setting a transition vector bit to 1 will cause that tap output to toggle. For a left-justified pulse, transition-vector bit 0 is set to 1, since the pulse starts at the beginning of the clock period. The calculated pulse width is then used as an index in order to set the second transition-vector bit. This vector bit will cause the pulse to turn off after a pulse width number of unit delays. Accordingly, time-delayed versions of the instruction word are generated. A time-delayed version of the instruction word generates transition data 1, as identified by the following relationship wherein:

Transition data 1 [/]=Transition data 2 [/] XOR toggle-command [/], where / varies from 0→n−1 for 32 bits, ranging from 0 to 31.

Figure 2:
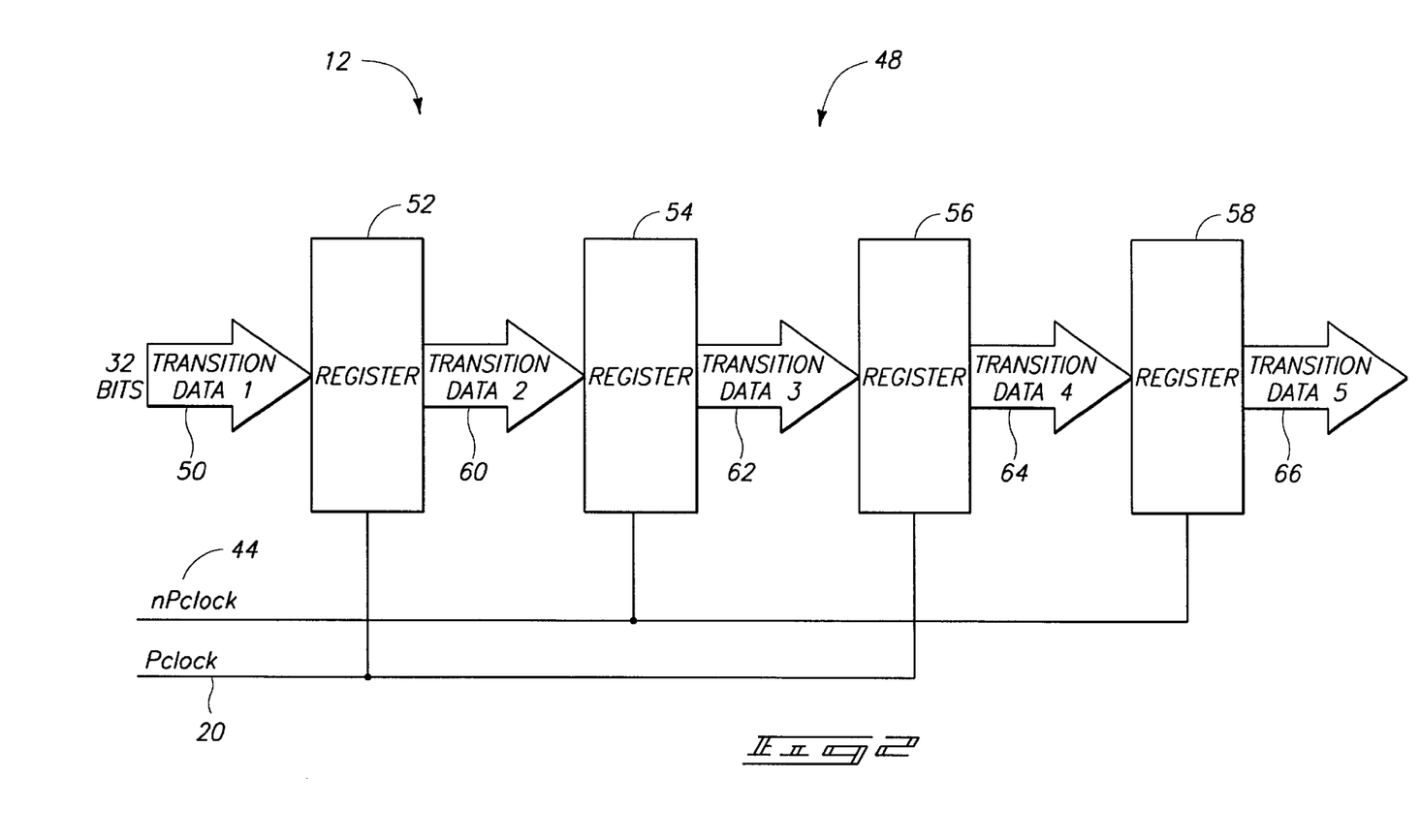
FIG. 2 is a block diagram illustrating a technique for generating vector data width setup and hold margin.

FIG. 2 illustrates a schematic block diagram of circuitry 48 for generating vector data with set-up and hold margins. More particularly, the transition vector discussed above is used to change the value present within a vector register. The transition vector is used to indicate which bits are to toggle from their present state. It is understood from the previous discussion that those bits present within the transition vector that are equal to "1" will be toggled from their present state. This toggling was accomplished by doing an "exclusive-or" of each respective bit present in the transition vector to the same bit in the vector register. The result is fed to the input to each register bit. However, an exception is provided for bit "0", which takes into account the number of "1's" present in the register. The bit "0" is equal to the "exclusive-or" of the current bit "0" value, the transition-vector bit "0" value, and the signal that indicates an odd number of "1's" present in the vector register. The above discussion is true for register 52, with remaining registers 54, 56 and 58 receiving copies of the previous, upstream registers.

For the case of right-justified pulses, a toggle is required at the end of the clock period in order to end the pulse. The beginning of the pulse is defined by a pulse width number of bits before the end of the clock period. However, the actual end of the clock period is the beginning of the next clock period. Therefore, it is necessary to carry information into the next clock period in order to finish right-justified pulses. In order to accomplish this, the registered vector output, present in flip-flops 18, are taken and counted to determine the number of "1's", using an exclusive-or function comprising an exclusive-or tree contained in block 12 (of FIG. 1) similar to exclusive-or circuitry 22. If it is determined that there are an odd number of "1's", the output will be "on", wherein "on" is a high signal present in the block diagram. The resulting information is used to determine how the vector [0] bit is to be toggled, along with the transition-vector [0] bit. In short, if the output is already "on", and the output needs to be "off", the vector [0] bit will toggle, even though the transition-vector bit [0] does not indicate a toggle, which means the value for the bit is not equal to "1". On the following cycle, the end result will be used to complete the right justified pulse.

For the case of center-justified and split-justified pulses, it is required that the pulse width be divided by two. Two numbers result, one being the pulse width divided by two, truncated to the nearest integer. The second number is equal to the pulse width minus the first half width. Hence, this value will be one greater than the first half if the pulse width is odd. For a center-justified pulse, the first index is equal to half the number of taps minus the second half width. The second index is equal to half the number of taps added to the first half width. The two bits indexed by these numbers are then set to the value "1". For the split-justified case, the second half width is placed at the first of the clock period by setting transition-vector [0] bit and the bit index by the second half width to "1". Additionally, the other half is right-justified by setting the bit index by the number of taps minus the first half width to "1". Again, the end transmitter of this part of the pulse will be taken care of with a change of vector [0] bit of the next clock period, or the next cycle of this process.

One important thing to remember is that the instruction bits provide the data inputs to the transition register flip-flops 18, shown in the block diagram of FIG. 1, which are clocked by the various clock delay taps. Therefore, these flip-flop registers will clock at incremental times that are linearly distributed across the clock period. It is important to the operation of Applicant's pulse width modulator that the transition register flip-flops 18 have adequate set-up and hold times in order to avoid metastability problems (i.e., data errors). Here, delay lines positioned near rising edges of Pclock have their instruction bits registered with the nPclock (inverse primary clock) so that the data is presented ½ clock earlier. Accordingly, the data is correctly loaded into the flip-flop in which it is intended. This problem is solved by using the negative edge of the primary clock, or the inverted primary clock shown as input "nPclock" 44 (of FIG. 1), so that delay-taps that are located near the primary clock rising edges are presented ½ clock sooner to be properly presented.

Registers 52–58 of FIG. 2 illustrate one implementation for electronic processing circuitry 12 of Applicant's invention. However, it is understood that other implementations can be used. Such implementation represents the idea of providing half clock period delayed views of the instruction bits, or vector register data. Actually, the vector output 16 from processing circuitry block 12 (of FIG. 1) comprises a combination of "Transition Data" vectors "1–5" (see reference numerals 50 and 62–66 of FIG. 2. "Transition Data 3" (reference number 62 of FIG. 2) contains the lower quarter of the bits, "Transition Data 4" (reference number 64) contains the middle half of the bits, and "Transition Data 5" (reference number 66) contains the upper quarter of the bits. The timing of the respective signals is represented below with reference to FIG. 3.

Figure 3:
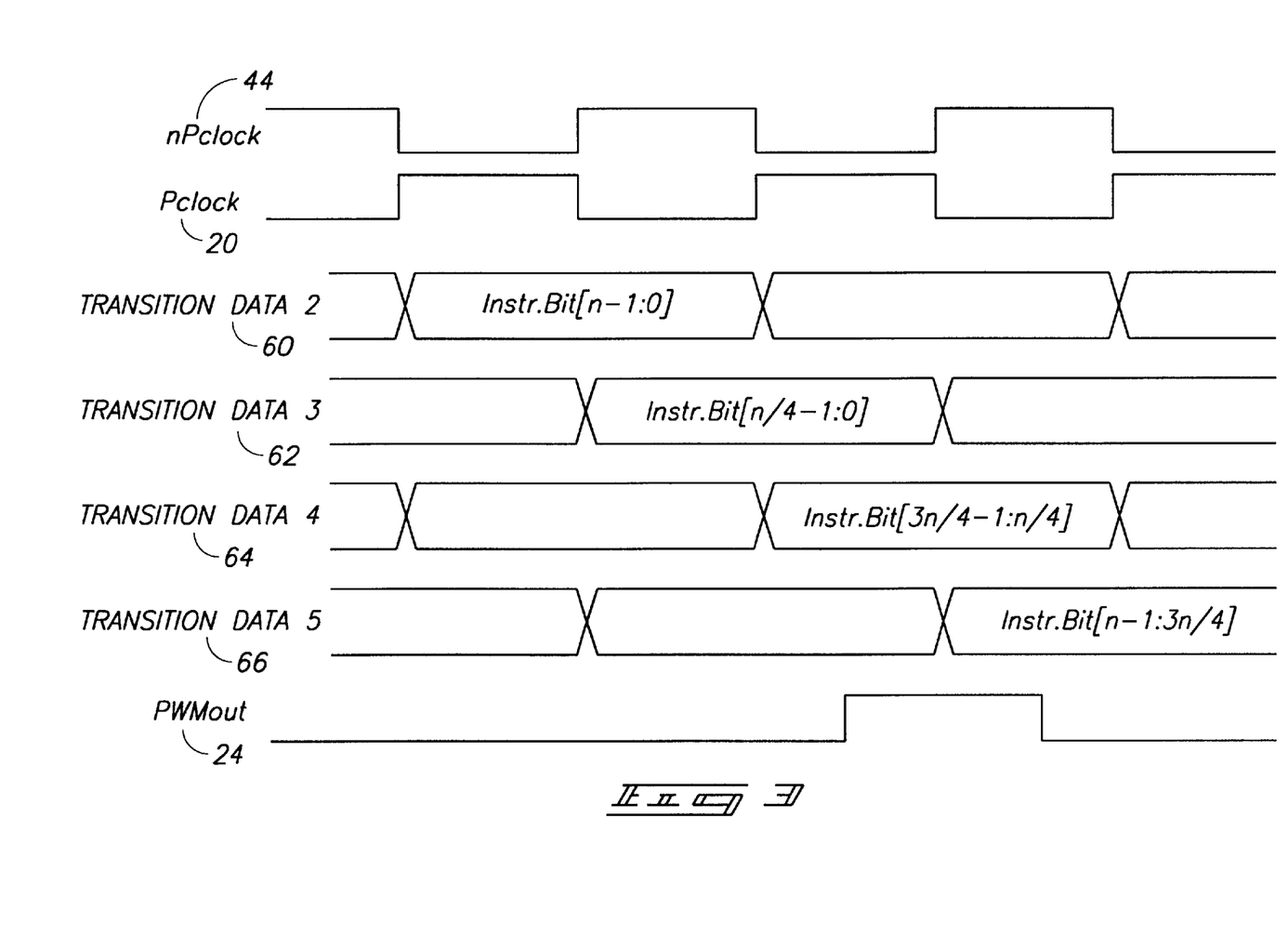
FIG. 3 is a timing diagram for a single, center-justified pulse.

As shown in FIG. 3, a timing diagram is depicted for the various components illustrated in FIG. 2. Data is illustrated and labeled for a single, center-justified pulse. Although the vector data is registered in the first clock cycle (Transition Data 2), the pulse is actually created in the next clock period (as shown by the PWMout signal). During the second clock period, the instruction bits are registered in the delay-tap flip-flops by the delay-tap clocks. The first quarter of the bits has been present for about ½ of a clock period (taken from Transition Data 3). The data will also be held for at least ¼ of a clock period. For the center half of the bits (Transition Data 4), the data will be set up for at least ¼ of a clock period (up to ¾ of a clock period). Data is also held for at least ¼ of a clock period. Likewise, the last ¼ of bits (from Transition Data 5) will be set up for at least ¼ of a clock period, and will have at least ½ a clock period hold time. It is important to note that the minimum hold and set-up time is ¼ of a clock period, which is typically sufficient for meeting flip-flop set-up and hold requirements. Hence, FIG. 3 illustrates the vector delay timing for various aspects of the transition instruction processing circuitry 12 of FIG. 1.

Figure 4:
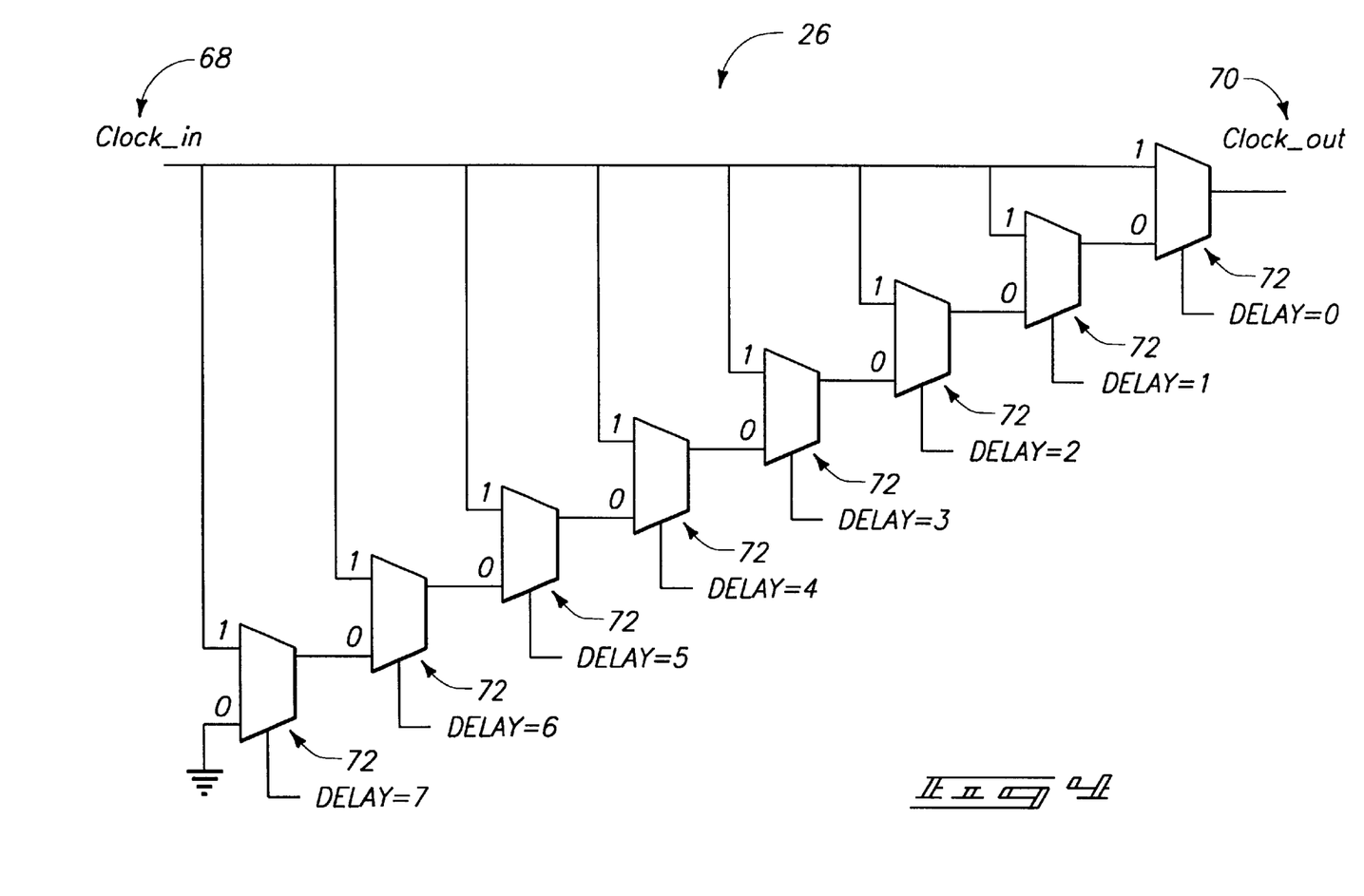
FIG. 4 is a diagram of one circuit implementation for realizing a delay element comprising a cascade of multiplexers.
Figure 6:
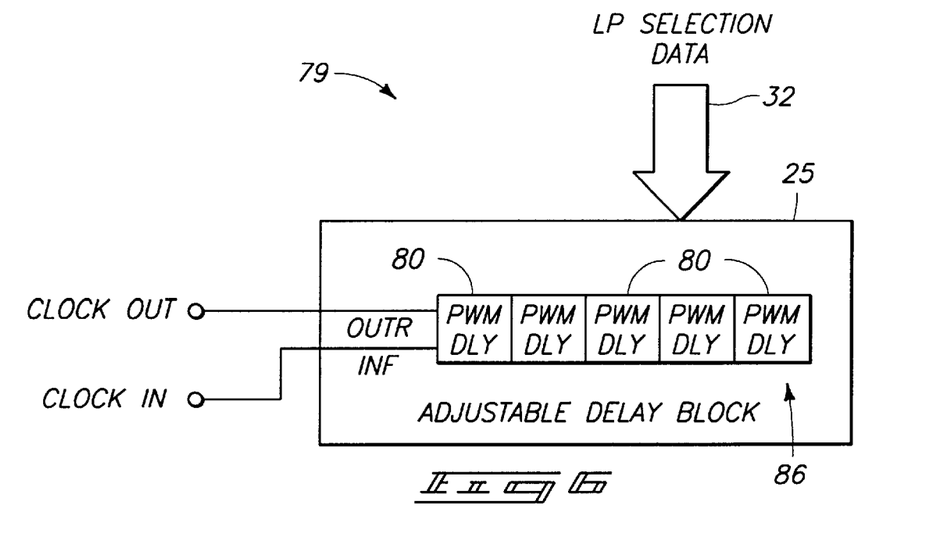
FIG. 6 is a diagram of LP selection data being input to one adjustable delay block of FIG. 1.
Figure 7:
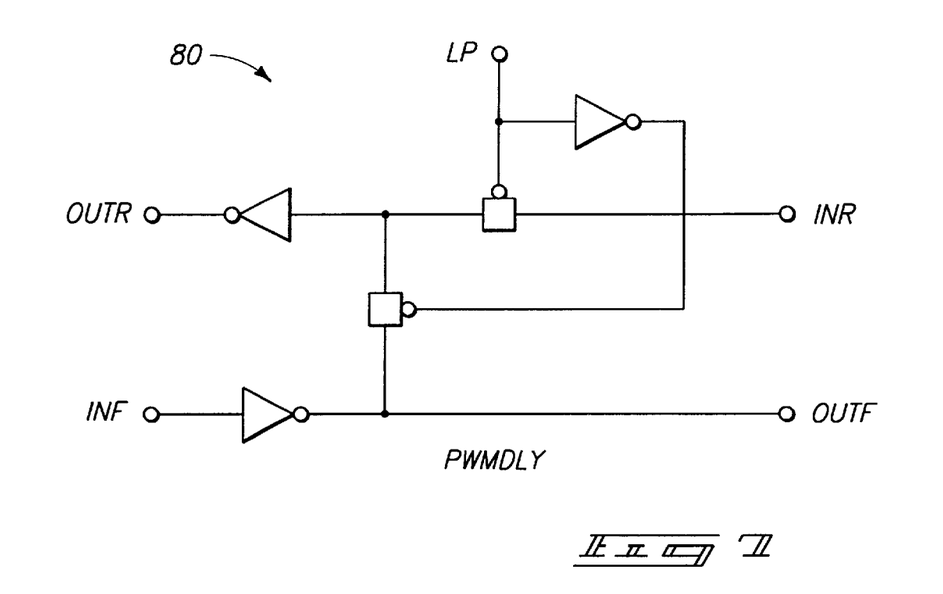
FIG. 7 is a diagram of another circuit implementation over that shown in FIG. 4 for realizing a delay element comprising a delay cell having two pass-gates.
Figure 9:
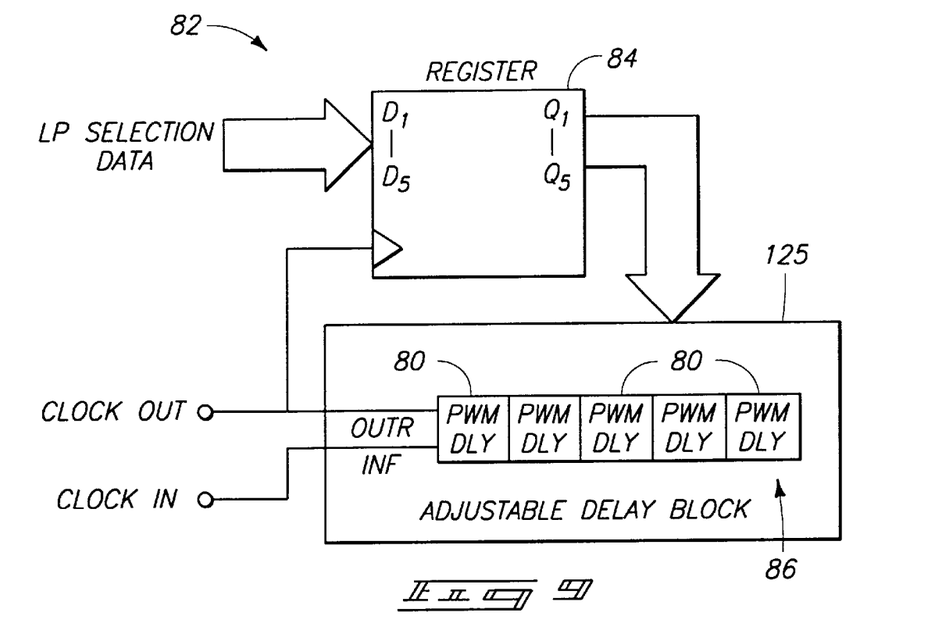
FIG. 9 is a diagram of a synchronization circuit that is used with the delay cell of FIG. 7.

FIGS. 4 and 7 disclose alternative implementations for delay cells 26 and 80, respectively, for use in adjustable delay blocks 25 of FIG. 1 and 125 of FIG. 9. According to the implementation depicted in FIG. 4, a delay cell 26 is configured as an array of multiplexers. According to the implementation depicted in FIG. 6, delay block 25 is formed from a plurality of delay cells 80 formed as a delay cell chain 86. As shown in FIG. 6, each delay cell 80 is formed by a delay cell circuit as shown in FIG. 7.

FIG. 4 illustrates one implementation of a delay cell 26 for use in forming adjustable delay block 25 (of FIG. 1). One key to the design of Applicant's pulse width modulator is provided by the adjustable delay element features of delay cell 26 which are used to produce each delay tap. Delay cell 26 comprises an element or delay cell that has a single input (Clock_in) 68 and a single output (Clock_out) 70. The single output 70 comprises a delayed version of input 68. Output 70 also has a bit vector input, comprising an unsigned number, which indicates the amount of delay that is to be inserted between signal input 68 and signal output 70. In short, the bit vector indicates the number of delay elements that are to be inserted into the signal path. However, the insertion needs to be done in such a way that will not produce a large delay when the delay selection is "0".

Delay cell 26 can be implemented in several ways. It is a goal that the total delay can be described by the equation:

$$delay = dc\_delay + delay\_vec * ac\_delay$$

where delay_vec is the bit vector input for delay selection, dc_delay is the delay when delay_vec equals "0", and ac_delay is the incremental delay. One possible delay format is represented by the circuit implementation for delay cell 26 depicted in FIG. 4.

Figure 5:
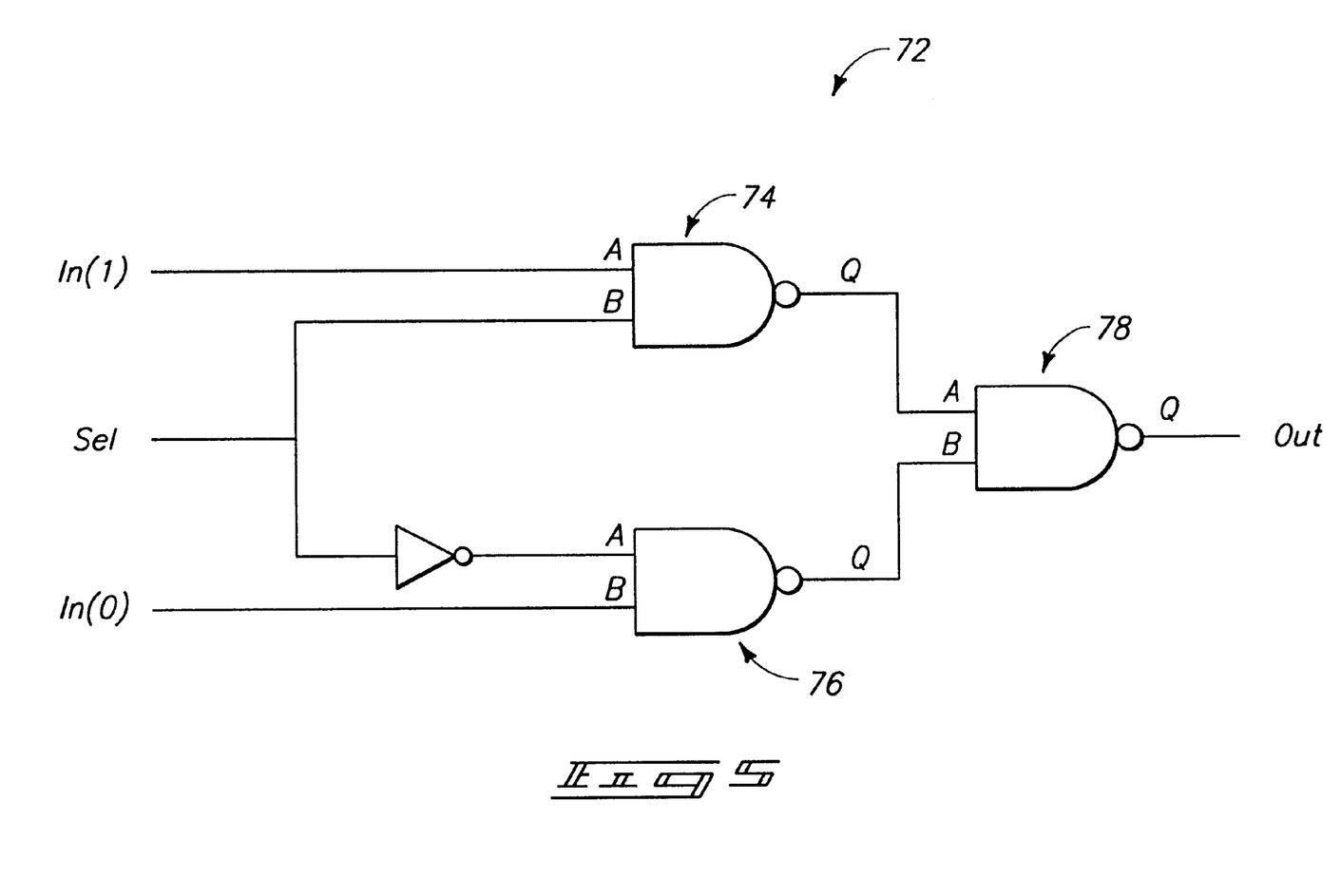
FIG. 5 is a diagram of a delay multiplexer suitable for use with the circuit implementation of FIG. 4.

As shown in FIG. 4, delay cell element 26 comprises a cascade of multiplexers 72, where each multiplexer 72 serves as an atomic delay mechanism. A delay setting of "0" results in the delay of only the final multiplexer in the array. It may actually have a smaller delay, or larger driver, than the other delays since it represents a constant delay value, whereas the other multiplexers provide the adjustable delay. One drawback of this design is the larger fanout of the input signal. This input may need to be buffered. Such buffering can be done via simple buffering circuitry (not shown). However, if high frequencies are required, thus low constant delay, the "0" and "1" delay inputs may be fed from the input signal directly, while the other multiplexer inputs may receive a buffered version of the input signal. In practice, Applicant's design selects which delay multiplexer 72 will start the propagation of the input clock signal 68 to the output clock signal 70. Only one multiplexer can be selected with the value of "1", since the selection logic is the result of comparing the delay selection vector to a unique, ascending value, number.

One desirable feature is to have multiplexers 72 to be as balanced as possible so that the clock duty cycle can be maintained. A balanced condition occurs when the rise time delay is equal to fall time delay. In some cases, a traditional standard cell multiplexer may not sufficiently meet this requirement. In such cases, a custom-designed cell may be necessary, or a multiplexer could be built out of more basic gate elements, as shown below with reference to FIG. 5.

As shown in FIG. 5, multiplexer 72 is built out of a set of basic gates, and is designed with ICBD's CMOS 14 2-input NAND gate being used as a component of the design. More particularly, for such NAND gates 74, 76 and 78, the sum of the rise and fall times of the A input equals the sum of the rise and fall times of the B input. Therefore, In (0) and In (1) have the same delay to Out. Even if the delays from the two inputs to Out were not equal, which may be acceptable if they are close to the same amount, the rise and fall times of the In (1) to Out path are equal. In addition, the rise and fall times of the In (0) to Out are also equal. For example, if In (0) is rising, the first NAND gate has a B rising to Q propagation delay. The second NAND gate has a B falling to Q propagation delay, since the first NAND gate inverts the input. If In (0) is falling, the first delay is B falling to Q; the second delay is B rising to Q, with the same delays in opposite order. The propagation delays of the rise and fall conditions, ignoring routing and loading considerations, are equal.

Also shown in FIG. 5, a "Sel" input is provided to multiplexer 72. The "Sel" input is not shown in FIG. 4. Such "Sel" input is analogous to the "LP" input in the implementation of FIG. 7. For each implementation, the "Sel" and "LP" inputs are delivered via adjustable delay settings 32 (of FIG. 1). Accordingly, adjustable delay settings 32 (of FIG. 1) include individual inputs to the "Sel" input and the "LP" input or their respective embodiments.

As shown in FIG. 1, calibrate state machine 28 is implemented via circuitry 30 to provide a feedback path that will result in generating a total delay that is roughly equal to the clock period. In other words, the delay of n adjustable-delay elements is roughly equal to the clock period. It is understood that n equals the number of taps. The calibrate process takes the sampled taps of the delay chain as its input. The data is then analyzed and indicators are generated. The indicators are as follows: The delay is very fast (too short of a delay); slightly fast, slightly slow, very slow (the delay is too long); or just right. A counter is adjusted according to the indicators. A new count will change the adjustable delay settings. After waiting a given number of clock cycles, to allow the delay-tap transitions to settle, the measurement cycle starts again until only the "just right" indicator is set.

In order to better understand implementation of calibration state machine 28, it becomes necessary to understand the technique for measuring the clock delay chain. Note that the pulse forming logic, including the delay-tap flip-flops clocked by the clock-delay taps and the "exclusive-or" tree 22 that combines the flip-flops' outputs, require only n−1 adjustable delay elements 25. Here, n represents the number of taps. The $n^{th}$ delay elements output will actually be near the Video Clk rising edge, of the next clock period. As discussed above with reference to the instruction bit vector generation, transitions that occur at the end of the clock period are done at the beginning of the next clock period. The purpose of the $n^{th}$ delay element is to have a calibration reference point.

FIG. 6 illustrates an alternative implementation for realizing adjustable delay block 25 (of FIG. 1). According to this implementation, adjustable delay block 25 is formed by a plurality of individual delay cells 80 that are formed together in a chain 86. Chain 86 comprises a plurality of individual cells 80 constructed as described below with reference to FIG. 7. Adjustable delay settings 32 (of FIG. 1) are delivered to each delay block 25 in the form of LP selection data 32. Delay cell chain 86 receives a "clock in" signal and delivers a "clock out" signal in response thereto. The "clock out" signal is delayed from the "clock in" signal.

FIG. 7 illustrates a diagram of delay cell circuit 80. Delay cell circuit 80 utilizes two pass-gates to either select the INF input to drive the OUTR output, or to have the INR input drive the OUTR output. One of the two pass-gates is on at a time. Additionally, the INF input drives the OUTR output when LP is high. Similarly, the INR input drives the OUTR output when LP is low. The actual placement of the inputs and outputs is important. For example, as two PWMDLY cells are placed side by side, the INR connects to the OUTR of the cell to its right. Furthermore, the INF connects to the OUTF of the cell on its left. In this manner, the signal travels down the series of PWMDLY cells from one cell's OUTF output into the next cell's INF input. When a cell is reached where the LP signal is set to high, the INF signal is diverted to the OUTR signal and then travels back to the chain of PWMDLY cells until the first cell's OUTR port is reached. By selecting a certain PWMDLY cell within a chain, the delay through the chain of cells 86 is proportional to the position of the chosen PWMDLY cell, or delay cell circuit 80. A certain PWMDLY cell 80 within chain 86 (see FIG. 8) is selected by setting its associated LP input to have a high value. Therefore, adjustable delay block 125 (of FIG. 9) uses a chain 86 of individual PWMDLY cells 80.

Figure 8:
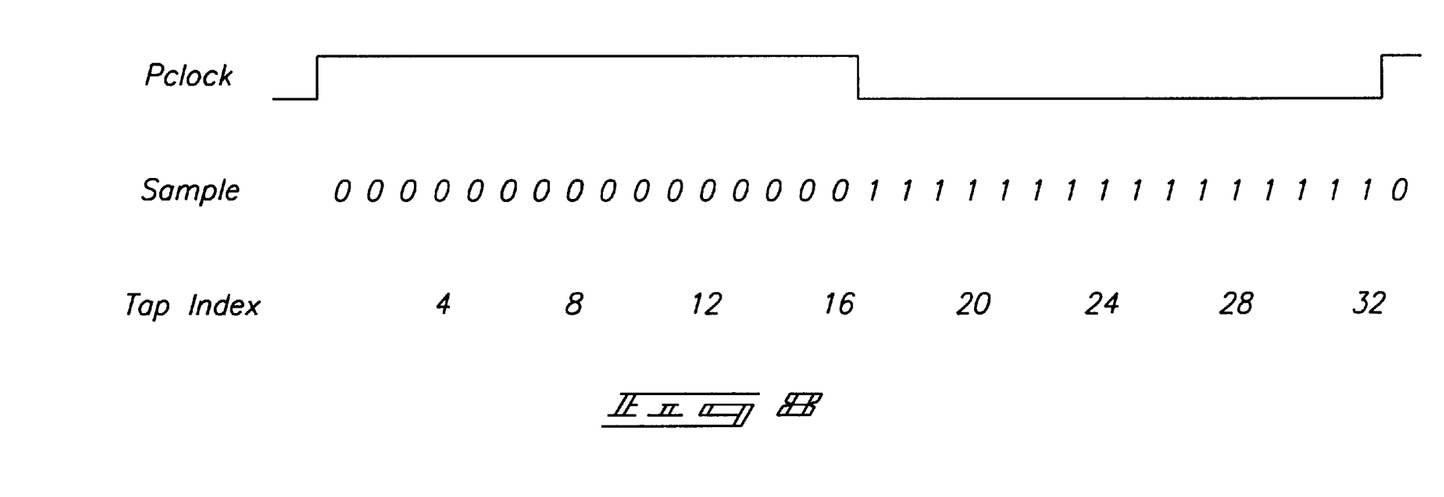
FIG. 8 is a timing diagram for the calibrated case showing a calibration measurement for 32 taps.

FIG. 8 gives an indication of how the clock-measuring flip-flops will see a calibrated delay chain. Roughly the first half of samples, depending on the clock duty cycle, will be "0", since these taps have not yet seen the rising edge of Video Clk. The last half of the taps will be "1", since these taps have not seen the falling edge of the Video Clk. In short, the tap samples are the inverse of the Video Clk at the given tap location. The $n^{th}$ delay element sample will probably be "1", since it is changing at the same time the flip-flop is clocking. Note that there is another adjustable delay element in the chain, after the $n^{th}$ element. This adjustable delay element 25 is noted with an asterisk (*) in FIG. 1 in order to denote that this delay element is not identical to the previous n elements. The purpose of adjustable delay element 25(*) is to take a sample on the other side of the rising clock edge. Such element only needs enough delay to meet this goal. Since this sample is taken on the other side of the clock edge, its value is "0".

FIG. 8 illustrates a calibration measurement for 32 taps. Such measurement involves generating indicators. From the measurement data, the slightly fast, very fast, slightly low, and very slow indicators are created. In addition, signals are generated that indicate when the delay chain has been successfully calibrated. In order to generate all the indicators, the number of transitions (not including the n+1, or last, value) in the measurement data needs to be determined. This is accomplished by using "exclusive-or" gates 38–42 (of FIG. 1) between each tap and its neighbor to the right. The number of "1's" from the "exclusive-or" gates is the number of transitions, and a total number is then counted.

For a calibrated case which is illustrated in FIG. 6, there exists one transition. If the delays were a little short, such as the taps are running fast, the slightly fast indicator would be set by recognizing that the n and n+1 values would be both "1". Hence, the samples effectively expand and shift right, making the n+1 value go to "1". A very fast indicator would be that all taps are in the first half of the clock, all samples being "0". Therefore, there would be no transitions in the data.

If the delays were a little long, the samples would effectively compress and shift left, making the n value "0". The slightly slow case would have two transitions, but the last two values would also be "0". If the delays are really long, they will start spanning multiple clock periods, resulting in more than two transitions, wherein transitions represent frequency aliases. The "just right" position would be described as having one transition with the $n^{th}$ value equal to "1" and the n+1 value equal to "0".

For the case where the delay granularity is too large, the "just right" case may never be reached. Therefore, one additional status signal is the "calibrate converging" case. If the state machine starts toggling between a slightly fast and a slightly slow indicator, on alternating calibration cycles, then the calibration is converging toward the stable state. However, the calibration is not actually meeting the stable state. This output is set whenever the calibrate state machine 28 (of FIG. 1) is oscillating between the slightly fast and slightly slow cases.

A further aspect of Applicant's invention requiring greater description involves the technique for generating adjustable delay settings. The mechanism for adjusting delay settings uses a counter. State machine 28 (of FIG. 1) increases the count when the fast indicators are set, and decreases the count when the slow indicators are set. However, state machine 28 does not increase the count the same when the very fast indicator is set, as it does when only the slightly fast indicator is set. Since a very fast indicator means the delays are at least half as long as they should be, the count is increased to 2x+1 (shift left, insert "1" into least significant bit when fast; the count only increases by numeral "1" (incremented) when slightly fast. Likewise, a very slow indicator decreases the count by ½ (shift right) and a slightly slow indicator decreases the count by numeral "1" (decremented). Since fast or slow delays increase and decrease very fast or very slow; i.e, delays are way off, the count is increased or decreased by a factor of 2. Therefore, calibration will complete from a reset condition in a reasonable amount of time. For a 32-tap design, this typically occurs in less than 2,000 clock cycles from a reset condition, which is a worse-case condition.

The adjustable delay elements of delay blocks 25 (of FIG. 1) have a selection input with enough bits to select as many atomic delay units as are needed in order to generate enough total delay for the specified clock frequency. Of course, the selection of all the taps cannot be increased at the same time because the steps would be too coarse. All that is needed is that just one, or a few, counts be incremented at a time. Therefore, the counter has enough bits for the adjustable delay selection bits in addition to enough bits to address the number of elements groups. In the worse case, the number of groups equals the number of taps.

In operation, the counter affects the selection of bits of the various delay elements of delay blocks 25 such that the increased delay is spread as evenly across the clock period, or delay tap line, as possible. Each delay element selection calculator receives the upper bits of the calibration counter, which is equal to its number of selection bits. The calculator then compares the remaining lower bits of the calibration counter with its firing-order number. If the lower bits are greater than the firing-order number, then the selection input is incremented before it is passed to the delay element. Otherwise, the selection input, or upper bits of the calibration counter, pass unchanged to the delay element. The firing-order number is determined by a translation function, which was designed to balance the delay increase across the tap line as much as possible.

The last adjustable delay block 25, indicated by an asterisk (*), does not have the same delay selection as the other delay blocks 25, as shown in FIG. 1. However, the delay needs to be fairly constant across variations in process, voltage, and temperature. The process, voltage, and temperature (PVT) parameters will change the delay of the atomic delays, or multiplexers, of the adjustable delay elements of blocks 25. Therefore, by passing the upper bits of the calibration counter to the last delay element, its delay should be fairly consistent with process, voltage and temperature (PVT).

The pulse width modulator of Applicant's invention described above with reference to FIGS. 1–6 has three distinct operating modes. A first operating mode comprises a calibration mode, which happens whenever the video block is not actively putting data out. The second operating mode comprises an active mode, when data could be received by the pulse width modulator for generating pulses. The third operating mode comprises a test mode, specifically for functionally testing the pulse width modulator delay chains and calibration logic during manufacturing and testing (or chip testing).

To identify or enable the calibration mode, an input signal is operative to indicate when calibration is to be done. If the video block is not enabled, the calibrate signal is active. Additionally, the calibrate signal should be set in between lines in order to allow the calibration to be adjusted throughout the page of a document being printed. This duration of time should be specified as occurring after all the data for the given line has been sent, and extending to the beginning of the next line. During calibration, the vector generation circuitry block 12 (of FIG. 1) is disabled in order to keep transitions from occurring during delay setting changes, thus creating glitches on the output. There may be times that the calibration needs to be disabled. In a test mode, a pulse width modulator control register bit is provided for disabling the calibration process. This feature is incorporated into a calibration command input which provides an input to determine when it is okay to carry out a calibration. There is a register bit used to disable this calibration feature for overriding the calibrate command input during a test mode.

When the pulse width modulator is not in a calibration or a test mode, an active mode is available. The active mode needs to be enabled by the ENABLE_PWM signal. According to one implementation, active mode can be enabled by default, thus requiring intervention only when active mode is to be disabled. However, since the calibrate signal will override the active mode, the calibrate signal cannot be asserted during the active portions of a line. Furthermore, the enable signal also should not be cleared during active lines, When active, the pulse width modulator will process Pulse Code data inputs, generate transition vectors, and clock transitions through the "exclusive-or" tree 22 (of FIG. 1) to the video output 24, thus generating pulse modulations.

In order to provide for a testable design, it is necessary to provide test modes for the pulse width modulator. Applicant's pulse width modulator is capable of implementing three basic test modes. First, the design is capable of being scanned with Automatic Test Pattern Generation (ATPG) vectors. Secondly, the essential delay paths through the Adjustable Delay elements will be measured and verified as being linear. A control register input will allow the calibration counter to be loaded with a specified value, so a specific path through the Adjustable Delay is selected. The output of the $n^{th}$ delay element will be routed to a pin for this measurement. The delay of the output pin should increase proportional to the delay selection. Last of all, transitions through various vector bits will be measured, at a frequency the pulse width modulator has been calibrated at, to verify the calibration logic and tap linearity. The pulse width modulator will be calibrated to a given frequency. Control logic will be used to cause rising and falling edges on a specific tap output. The actual transition time will be compared to other tap transition times in order to see if the results are linear, and to see if they correlate to the input frequency.

FIG. 9 illustrates an alternative implementation for delay cell components utilized in the automatically calibrated pulse width modulator 10 depicted in FIG. 1. A particular implementation for delay cell 80 disclosed in FIG. 7 is also used here. The incorporation of such delay cell circuitry 80 is shown in a chain of cells 86 provided in an adjustable delay block 125, within a synchronization circuit 82. It is understood that adjustable delay block 125 is substituted for adjustable delay block 25 of FIG. 1. Accordingly, the feature of register 84, shown in FIG. 8, must be added to FIG. 1, in conjunction with the substitution of adjustable delay block 125 for delay blocks 25. Such implementation, as shown in FIG. 9, provides for the additional implementation of continuous calibration within the automatically calibrated pulse width modulator 10 (of FIG. 1). For purposes of discussion with reference to FIG. 9, it is understood that pulse width modulator 10 (of FIG. 1) substitutes adjustable delay block 125 for adjustable delay block 25, and adds register 84, accordingly. In describing features of this alternative construction of Applicant's invention, it is understood that the remaining components of pulse width modulator 10, as depicted in FIG. 1, also apply with respect to this alternative embodiment of FIG. 9.

FIG. 9 uses delay cell circuit 80 (of FIG. 7) which forms a key element of an alternatively constructed, automatically calibrated pulse width modulator (PWM). Delay cell circuit 80 is used to construct the adjustable delay block 125 of FIG. 9, which is substituted for the adjustable delay block 25 in FIG. 1. Adjustable delay block 125 of FIG. 9 has a programmable delay. In other words, the amount of delay imparted by block 125 is controllably regulated via register 84 of FIG. 9.

In the first embodiment taught with respect to FIGS. 1–6, delay cell 26 was formed by a plurality of multiplexers 72, as shown in FIG. 4. According to such implementation, delay of multiplexer 72 provided the incremental delay, or fundamental delay, that function to increase the delay of the adjustable delay block 25 (of FIG. 1). However, the fundamental delay imparted by the multiplexers 72 of FIG. 4 is typically quite small since there are many fundamental delay cells in this total design. For example, a typical design would have 32 adjustable delay blocks, for 32 taps, with each block having about ten fundamental delay cells, for a total of 320 fundamental delay cells. The preferred implementation of such multiplexer was shown in FIG. 5, and included three NAND gates and one inverter.

However, the previous embodiment delay cell depicted in FIGS. 4 and 5 can be undesirable for some applications. All the signal paths in the delay chain tend to be timing critical, and the routing of the various cells and wires becomes significant. For the case of a multiplexer design as shown in FIGS. 4 and 5, the routing of over 1,000 gates would need to be controlled. In other words, the gates and wires would need to be placed manually instead of using an automatic generation tool, in order to control the delay of the various cells and wires. Such a task would be very time consuming, which has lead to the alternative construction depicted with reference to FIGS. 6, 7 and 9.

As shown in FIG. 7, delay cell circuitry 80 forms a delay cell that simplifies the process of routing various cells and wires within adjustable delay block 125 of FIG. 8. From a functional perspective, delay cell circuit 80 performs essentially the same function as multiplexers 72 within delay cell 26 of FIG. 4.

As shown in FIG. 9, the input signal, here CLOCK IN of the adjustable delay block 125, connects to the first PWMDLY cell 80 via a INF input. Furthermore, the output of the adjustable delay block connects to the first PWMDLY cell 80, via a OUTR output.

One important feature realized by implementing adjustable delay block 125 (of FIG. 9) via delay cell circuit 80 (of FIG. 7) results in a significantly simplified system of routing circuitry. The PWMDLY cells 80 need only be placed in a position where ports match up to adjacent cells. During the routing process, signals at the ends of the chains are the only signals that need to be handled with special care when performing a routing operation. The number of wires needed to be manually placed is significantly reduced to the order of about 100 instead of the several thousand wires that are needed when laying out the multiplexer design described previously with respect to FIGS. 4 and 5. Hence, such alternative implementations significantly simplify the process of routing such connections during circuit layout on a specific integrated circuit (IC) implementation.

Implementation of delay circuit 80 (of FIG. 7) within adjustable delay block 125 of synchronization circuit 82 (of FIG. 9) such that adjustable delay block 125 substitutes for delay block 25 in FIG. 1 and provides for an implementation of a pulse width modulator that can be calibrated during idle times. Hence, such a pulse width modulator can be calibrated when no pulses are being generated by the pulse width modulator.

For example, for the case where such a pulse width modulator is being used to deliver signals to a laser within a laser printer, there exists adequate idle time at the end of each laser scan line. Accordingly, such a pulse width modulator can be calibrated every line. The prior art techniques do not enable such calibration during idle times, after each line. However, the primary reason for limiting calibration such that calibration only occurs during idle time is to avoid discontinuities, or glitches, in the pulse width modulator output. Outputs of the adjustable delay blocks, or various taps, are delayed clocks, spread evenly across the primary clock cycle. If the delay of a given block changes as the clock edge is propagating through a block, the output of a block could generate a discontinuity as the path is changed.

Such a glitch occurring on the clock output would cause problems for circuitry that is driven by the clock output.

It is understood that a clock glitch will occur during calibration, unless the inputs to the flip-flops which are clocked by these outputs do not change, in which case there will be no problems. One instance where the inputs to the flip-flops do not change is during idle times.

In order to implement changes within an adjustable delay block 125 as shown in FIG. 9, it is necessary to implement synchronization. Accordingly, synchronization circuit 82 of FIG. 9 implements changes when the clock signal is not traversing block 125. Since the clock edges are periodic and the delay through block 125 is much less than the resulting period, output of the adjustable delay block 125 could be used to synchronize selection inputs to block 125. Such selection inputs comprise LP SELECTION DATA that are generated by the calibrate state machine 28 (of FIG. 1), and are used to select the correct PWMDLY LP that provides the correct delay through block 125, by enabling the appropriate PWMDLY 80.

Therefore, the selection inputs will not necessarily change at a specific time that is synchronized with the clock output of block 125. When the clock edges leave the associated PWMDLY cell 80, there is a time to change the LP selection before the next clock edge arrives. By registering the selection data with the clock output of block 125, the delay path can be changed before the next clock edge arrives. Here, the next clock edge arrives approximately half a clock period later.

In some cases, there may be metastable considerations with the selection data inputs. However, two cascaded sets of registers could be used in order to avoid such problem. The calibration state machine, corresponding with calibrate state machine 28 (of FIG. 1), waits for three to four cycles in order to allow the delays to stabilize before attempting another calibration cycle. Accordingly, the extra delay will not be a problem.

By utilizing the synchronization circuit 82 of FIG. 9, calibration can occur while the pulse width modulator 10 (of FIG. 1) is operating, since the clock signals passing through the delay chain will not have any discontinuities or glitches. The calibration state machine, or calibrate state machine 10 (of FIG. 1), may need to be modified for continuous calibration mode in order to account for a converging calibration. A converging calibration occurs wherein the calibration toggles back and forth between two adjacent settings, each setting being on either side of the ideal calibration. The state machine may need to control the toggling in a pseudo-random fashion in order to avoid introducing a regular, high-frequency noise within the pulse width modulator output. However, the need to implement such modification is only required when such a high-frequency noise will be perceptible to a specific application. For certain cases, such implementation will not be necessary.

Figure 10:
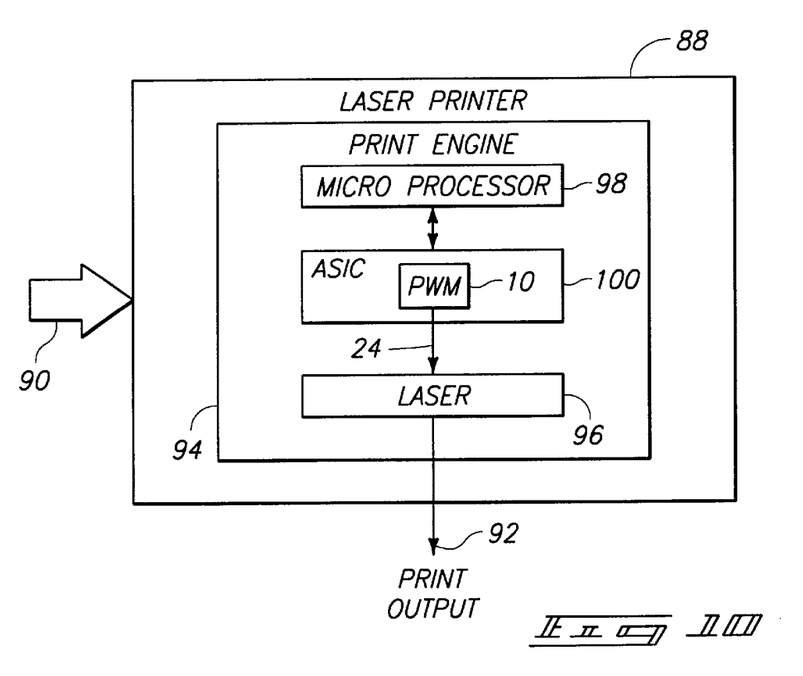
FIG. 10 is a simplified hardware block diagram of major components used in a printing mechanism having the advantageous features of Applicant's invention.

FIG. 10 illustrates one exemplary implementation for Applicant's novel pulse width modulator having automatic calibration and delay-line technology. More particularly, an output device in the form of a printer 88 is shown in block diagram form. According to one implementation, printer 88 comprises a laser printer having a microprocessor 98 and memory (not shown). A print engine 94 is also provided, including a pulse width modulator 10 and a laser 96. Pulse width modulator 10 is implemented on an Application Specific Integrated Circuit (ASIC) 100. Instructions from the printer's processor rapidly turn on and off a beam of light from laser 96 via print engine 94 and pulse width modulator 10. A pulse width modulator output signal 24 is utilized to turn on and off laser 96 such that a beam of light comprising print output 92 is delivered onto a photoconductor drum (not shown) where toner is deposited thereon at locations where an electrical charge is delivered onto the photoconductor drum by the laser. The ability to control the laser printer enables the delivery of finer variations in gray level or resolution when printing onto a piece of printer from the photoconductor drum. Accordingly, such a printing apparatus can put down varying durations of print markings having variable widths that impart perceptible variations in gray level to an individual viewing the print job.

Alternatively, printer 88 can be an inkjet printer wherein pulse width modulator 10 derives firing of a printhead so as to generate print markings having varying duration which imparts perceptible changes in resolution, or gray levels, to printed images. Accordingly, such implementation can also be used to add higher resolution to color print jobs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pulse width modulator, comprising:
   a clock operative to count successive discrete time intervals having a period equal to a desired full pulse width, and configured to generate a clock signal;
   an adjustable delay line comprising a plurality of delay line elements each comprising an adjustable delay cell, each delay line element operative to generate a clock signal at a specific location, which when combined with a transitional Instruction, will produce a modulated output that has a plurality of transitions within the clock period;
   processing circuitry configured to receive the clock signal and a pulse code input and operative to generate transitional instructions; and
   logic circuitry communicating with the adjustable delay line and the processing circuitry and operative to receive the transitional instructions, and further configured to combine multiple modulated outputs to generate a single modulated output that transitions at a desired modulated frequency.

2. The pulse width modulator of claim 1 further comprising a calibrate state machine operatively associated with the adjustable delay line and configured to automatically calibrate the pulse width modulator during periods of idle time.

3. The pulse width modulator of claim 1 wherein the delay line elements comprise discrete, adjustable delay cells.

4. The pulse width modulator of claim 1 wherein the delay line elements comprise individual, adjustable delay cell circuits.

5. The pulse width modulator of claim 1 further comprising synchronization circuitry and a calibrate state machine, the calibrate state machine operatively associated with the delay line to enable calibration of the pulse width modulator, and the synchronization circuit operative to enable calibration during operation of the pulse width modulator.

6. The pulse width modulator of claim 1 further comprising transitional registers coupled between the processing circuitry and the delay line elements of the adjustable delay line, and the logic circuitry comprises exclusive- or circuitry coupled with the transitional registers and operative to generate a pulse width modulator output signal.

7. The pulse width modulator of claim 1 wherein the processing circuitry comprises transition instruction processing circuitry operative to generate a transition instruction output signal.

8. The pulse width modulator of claim 1 wherein the produced single modulated output is toggled by the transition instruction.

9. The pulse width modulator of claim 1 wherein the transition instruction includes a plurality of transition locations by which the single modulated output will toggle or transition.

10. The pulse width modulator of claim 1 wherein the adjustable delay line cooperates with the processing circuitry to generate a plurality of clocks.

11. The pulse width modulator of claim 1 wherein the logic circuitry comprises a plurality of flip-flops and exclusive- or circuitry coupled with the outputs of the plurality of flip-flops, the processing circuitry comprising transition instruction processing circuitry, the transition instruction processing circuitry generating a transition instruction vector comprising an array of single-bit bit instructions delivered to the flip-flops so as to selectively enable the flip-flops.

12. A printer, comprising:
    a print engine having a pulse width modulator including a clock operative to count successive discrete time intervals having a period equal to a desired full pulse width, and configured to generate a clock signal, an adjustable delay line comprising a plurality of adjustable delay line elements, each delay line element operative to generate a clock signal at a specific location so as to generate a plurality of clocks, the plurality of clocks in cooperation with a transitional instruction, operative to produce a modulated output that has a plurality of transitions within the clock period, processing circuitry configured to receive the clock signal and a pulse code input and operative to select one of the delay line elements to generate a transitional instruction;
    logic circuitry communicating with the adjustable delay line and the processing circuitry and operative to receive the transitional instruction and the clock signal to combine multiple modulated outputs and generate a single modulated output; and
    an image-forming device configured to receive the single modulated output from the pulse width modulator and usable to generate a print image.

13. The printer of claim 12 wherein the pulse width modulator of the print engine further comprises a calibrate state machine operatively associated with the adjustable delay line and configured to automatically calibrate the pulse width modulator during periods of idle time.

14. The printer of claim 12 wherein the processing circuitry comprises transition instruction processing circuitry operative to generate an array of instruction bits, the instruction bits operative to select one of the delay line elements to generate the clock signal at a specific location.

15. The printer of claim 14 wherein the logic circuitry further comprises a plurality of transition registers, each comprising a flip-flop, and exclusive- or circuitry operatively associated with the transition registers.

16. The printer of claim 12 wherein the delay line elements each comprise discrete, adjustable delay cells.

17. The printer of claim 12 wherein the pulse width modulator further comprises synchronization circuitry and a calibrate state machine, the calibrate state machine operatively associated with the delay line to enable calibration of the pulse width modulator, and the synchronization circuit operative to enable calibration during operation of the pulse width modulator.

18. A method of generating a pulse width modulated output, comprising the steps of:

provic an adjustable delay line comprising a plurality of adjustable delay cells for generating a clock signal at a specific location;

providing processing circuitry configured to receive a clock signal from the adjustable delay line and generate transitional instructions;

generating a plurality of delay clocks by adjusting the delay cells to produce a modulated output that has a plurality of transitions within a clock period that transitions at a desired modulated frequency;

delivering a system clock signal comprising the modulated output to the processing circuitry; and generating a transitional instruction via the processing circuitry that toggles the modulated output that is generated at a primary clock frequency.

19. The method of claim 18 further comprising the step of generating adjustable delay settings for the plurality of adjustable delay cells.

* * * * *